(12) United States Patent
House et al.

(10) Patent No.: US 8,239,168 B2
(45) Date of Patent: Aug. 7, 2012

(54) SYSTEMS AND METHODS FOR FAULT DETECTION OF AIR HANDLING UNITS

(75) Inventors: John M. House, St-Leonard (CA); John E. Seem, Glendale, WI (US)

(73) Assignee: Johnson Controls Technology Company, Holland, MI (US)

( * ) Notice: Subject to any disclaimer, the term of this patent is extended or adjusted under 35 U.S.C. 154(b) by 491 days.

(21) Appl. No.: 12/487,594

(22) Filed: Jun. 18, 2009

(65) Prior Publication Data

US 2010/0324741 A1    Dec. 23, 2010

(51) Int. Cl.
*G06F 11/277* (2006.01)
(52) U.S. Cl. ...................................................... 702/185
(58) Field of Classification Search .................. 702/99, 702/113, 130, 136, 182, 183, 184, 185
See application file for complete search history.

(56) References Cited

U.S. PATENT DOCUMENTS

| | | | |
|---|---|---|---|
| 5,355,305 A | 10/1994 | Seem et al. |
| 5,414,640 A | 5/1995 | Seem |
| 5,506,768 A | 4/1996 | Seem et al. |
| 5,555,195 A | 9/1996 | Jensen et al. |
| 5,568,377 A | 10/1996 | Seem et al. |
| 5,590,830 A | 1/1997 | Kettler et al. |
| 5,682,329 A | 10/1997 | Seem et al. |
| 5,791,408 A | 8/1998 | Seem |
| 5,867,384 A | 2/1999 | Drees et al. |
| 6,122,605 A | 9/2000 | Drees et al. |
| 6,219,590 B1 | 4/2001 | Bernaden, III et al. |
| 6,223,544 B1 | 5/2001 | Seem |
| 6,265,843 B1 | 7/2001 | West et al. |
| 6,296,193 B1 | 10/2001 | West et al. |
| 6,369,716 B1 | 4/2002 | Abbas et al. |
| 6,389,331 B1 | 5/2002 | Jensen et al. |
| 6,408,228 B1 | 6/2002 | Seem et al. |
| 6,415,617 B1 | 7/2002 | Seem |
| 6,477,439 B1 | 11/2002 | Bernaden, III et al. |
| 6,594,554 B1 | 7/2003 | Seem et al. |
| 6,816,811 B2 | 11/2004 | Seem |
| 6,862,540 B1 | 3/2005 | Welch et al. |
| 6,937,909 B2 | 8/2005 | Seem |
| 7,031,880 B1 | 4/2006 | Seem et al. |
| 7,124,637 B2 | 10/2006 | Singhal et al. |

(Continued)

FOREIGN PATENT DOCUMENTS

SU          535103 A    11/1976

(Continued)

OTHER PUBLICATIONS

U.S. Appl. No. 11/669,859, filed Jan. 30, 2007, Seem.
U.S. Appl. No. 11/669,860, filed Jan. 30, 2007, Seem.
90.1User's Manual, Energy Standard for Buildings Except Low-Rise Residential Buildings, ANSI/ASHRAE/IESNA Standard 90.1-2004, cover page and pp. 6-43-6-48.
ASHRAE Standard, Energy Standard for Buildings Except Low-Rise Residential Buildings, ANSI/ASHRAE/IESNA Standard 90.1-2004, cover page and pp. 36-38.

(Continued)

*Primary Examiner* — Michael Nghiem
*Assistant Examiner* — Paul D Lee
(74) *Attorney, Agent, or Firm* — Foley & Lardner LLP

(57) ABSTRACT

A system is disclosed for detecting faults in an environmental control system for a building zone. The system includes a circuit configured to determine that a fault exists based on a comparison of the current value for the climate condition in a heating state and the estimate of the climate condition at which a transmission from the heating state to the no heating state is expected to be caused by a finite state machine of the system.

20 Claims, 11 Drawing Sheets

U.S. PATENT DOCUMENTS

| | | | |
|---|---|---|---|
| 2005/0166608 A1* | 8/2005 | Thybo | 62/125 |
| 2006/0090467 A1 | 5/2006 | Crow | |
| 2006/0259285 A1 | 11/2006 | Bahel et al. | |

FOREIGN PATENT DOCUMENTS

| | | | |
|---|---|---|---|
| WO | WO 00/68744 A1 | 11/2000 | |
| WO | WO 2009/012269 A2 | 1/2009 | |

OTHER PUBLICATIONS

International Search Report and Written Opinion for International Patent Application No. PCT/US2008/070091, mailed Sep. 30, 2009, 13 pages.

House et al., An Expert Rule Set for Fault Detection in Air-Handling Units, ASHRAE Transactions, 32 pages, 2001.

* cited by examiner

SYSTEMS AND METHODS FOR FAULT DETECTION OF AIR HANDLING UNITS

BACKGROUND

The present disclosure generally relates to the field of fault detection. The present disclosure relates more specifically to fault detection in environmental control systems such as air handling units.

Air handling units (AHUs) are often controlled by a controller implementing a finite state machine control strategy. Such a control strategy defines the various states of operation of the AHU (e.g., a heating state, a cooling state, etc.) and includes logic for determining when to cause the AHU to switch states.

The AHU, as controlled by its controller, is typically configured to regulate the mixture of outdoor air and return air with mechanical cooling or heating to efficiently condition the air being supplied to the building space being served by the AHU. Accurate control depends on receiving accurate sensor data regarding a climate condition in the building space (e.g., a current temperature, a current humidity, etc.), outside the building, or within the AHU.

A number of faults may occur that adversely affect the operation of the AHU. For example, a sensor error (ranging from complete failure to excessive noise causing inaccuracies) can produce faulty controller operation and therefore faulty AHU operation. Errors may also be due to leaky or stuck dampers or valves, fan problems, or other mechanical issues.

U.S. Pat. No. 6,223,544 to Seem titled "Integrated Control and Fault Detection of HVAC Equipment," issued May 1, 2001 (the '544 patent), which is incorporated herein by reference in its entirety, discloses a system for conducting fault detection in an environmental control system. The system of the '544 patent detects faults by comparing actual system performance to a model of the system, with the comparison producing a residual value indicative of whether the actual performance matches the model. In the '544 patent, thirteen residuals for conducting such a comparison are presented.

SUMMARY

One embodiment relates to a system for detecting faults in an environmental control system for a building zone. The environmental control system is controlled by a finite state machine that causes states of the environmental control system to change based on a varying climate condition. The system includes a circuit configured to receive a current value for the climate condition when the environmental control system is in a heating state and to calculate an estimate of the climate condition at which a transition from the heating state to a state of no heating by the environmental control system is expected to be caused by the finite state machine. The circuit is configured to determine that a fault exists based on a comparison of the current value for the climate condition in the heating state and the estimate of the climate condition at which a transition from the heating state to the no heating state is expected to be caused by the finite state machine.

Another embodiment relates to a system for detecting faults in an environmental control system for a building zone. The environmental control system is controlled by a finite state machine that causes states of the environmental control system to change based on a varying climate condition. The system includes a circuit configured to receive a current value for the climate condition when the environmental control system is in a no heating state and to calculate an estimate of the climate condition at which a transition from the no heating state to a heating state is expected to be caused by the finite state machine. The circuit is configured to determine that a fault exists based on a comparison of the current value for the climate condition in the no heating state and the estimate of the climate condition at which a transition from the no heating state to the heating state is expected to be caused by the finite state machine.

Yet another embodiment relates to a method for detecting faults in an environmental control system affecting a building zone. The method includes controlling the environmental control system using a controller implementing the control via finite state machine logic, the controller causing the environmental control system to change states based on a varying climate condition. The method further includes receiving, at a circuit, a current value for the climate condition when the environmental control system is in a no heating state. The method further includes calculating, using the circuit, an estimate of the climate condition at which a transition from the no heating state to a heating state is expected to be caused by the controller's finite state machine logic. The method further includes comparing the current value for the climate condition when the environmental control system is in a no heating state to the estimate of the climate condition at which the transition from the no heating state to the heating state is expected to be caused. The method further includes determining that a fault exists based on the comparison.

Yet another embodiment relates to a method for detecting faults in an environmental control system affecting a building zone. The method includes controlling the environmental control system using a controller implementing the control via finite state machine logic, the controller causing the environmental control system to change states based on a varying climate condition. The method further includes receiving, at a circuit, a current value for the climate condition when the environmental control system is in a heating state. The method further includes calculating, using the circuit, an estimate of the climate condition at which a transition from the heating state to a no heating state is expected to be caused by the controller's finite state machine logic. The method further includes comparing the current value for the climate condition when the environmental control system is in a heating state to the estimate of the climate condition at which the transition from the heating state to the no heating state is expected to be caused. The method further includes determining that a fault exists based on the comparison.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Referring generally to the figures, a system is shown for detecting faults in an environmental control system (e.g., an AHU) for a building zone. The environmental control system is controlled by a finite state machine (e.g., a state machine implemented by one or more electronic logic circuits) that causes states of the environmental control system to change based on a varying climate condition (e.g., temperature). The system includes a circuit configured to receive a current value for the climate condition when the environmental control system is in a heating state. The circuit is further configured to calculate an estimate of the climate condition at which a transition from the heating state to a state of no heating by the environmental control system is expected to be caused by the finite state machine. Using these inputs, the circuit is configured to determine if a fault exists. More particularly, the circuit is configured to compare (a) the current value for the climate condition in the heating state, and (b) the estimate of the climate condition at which a transition from the heating state to the no heating state is expected to be caused by the finite state machine.

The circuit may also be configured to detect faults when in the no heating state by comparing (c) the current value for the climate condition in the no heating state, and (d) the estimate of the climate condition at which a transition from the no heating state to the heating state is expected to be caused by the finite state machine.

Figure 1:
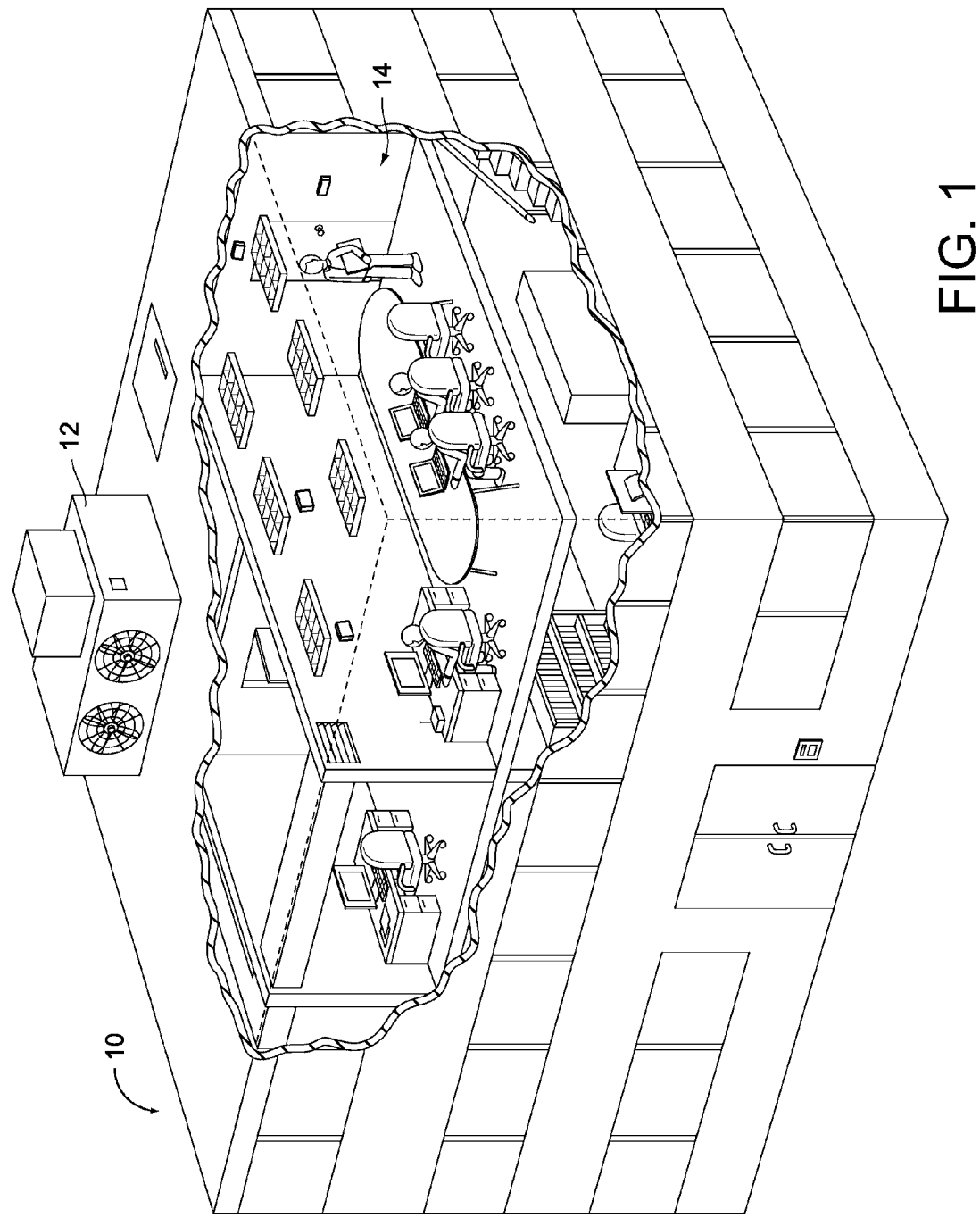
FIG. 1 is a perspective view of a building, according to an exemplary embodiment.

Referring now to FIG. 1, a perspective view of a building 10 is shown, according to an exemplary embodiment. Building 10 is shown to include a number of floors, rooms, spaces, zones, and other building structures and areas. Building 10 may be of any area of any size or type, including an outdoor area. The systems and methods of the present disclosure may be implemented in building 10 and in building systems serving building 10 (e.g., rooftop air handling unit 12 and a controller thereof). In other words, the environmental control systems described herein may be configured to affect a climate condition within buildings such as building 10.

Figure 2:
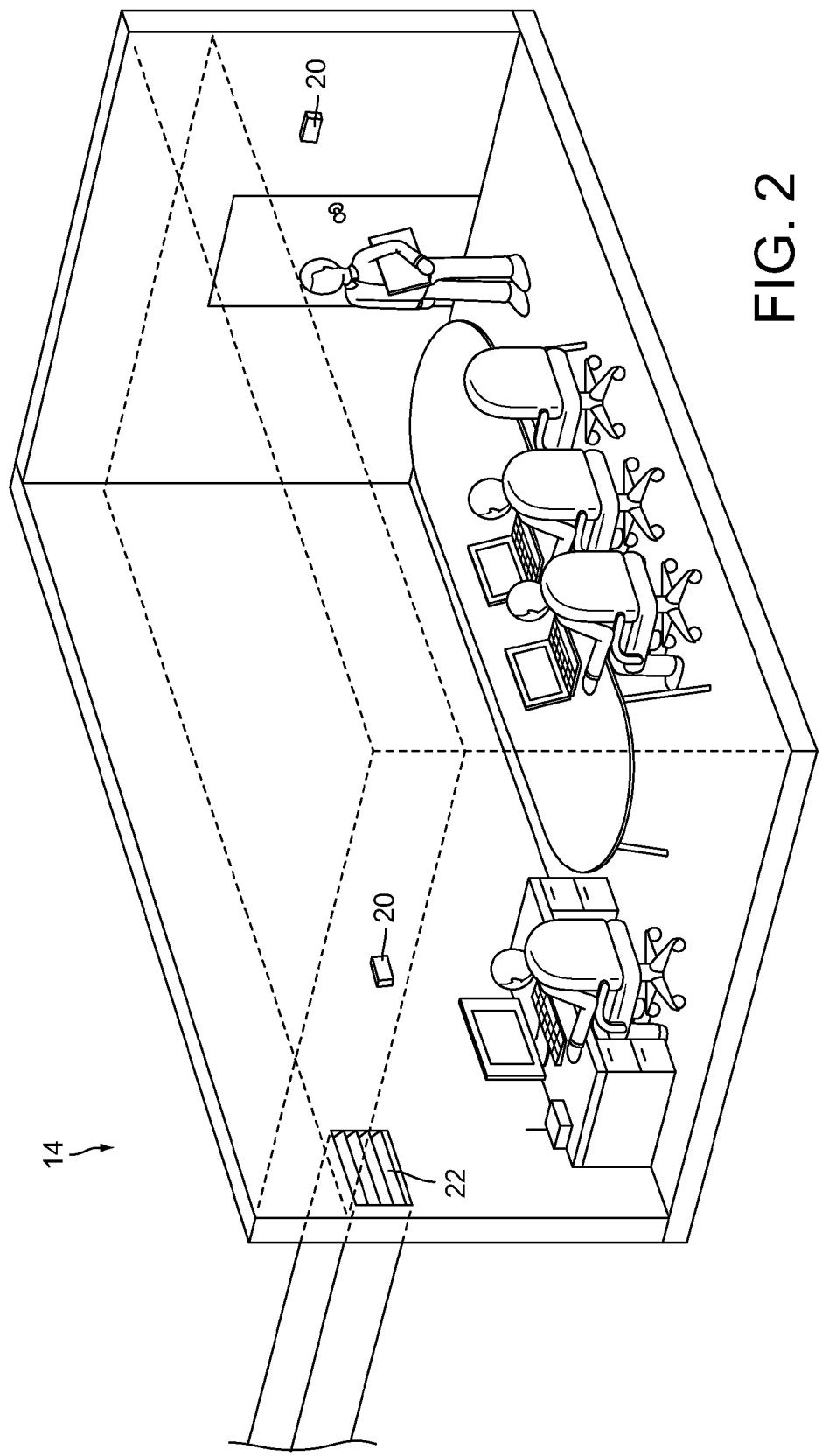
FIG. 2 is a perspective view of a building zone of the building of FIG. 1, according to an exemplary embodiment.

Referring now to FIG. 2, a perspective view of a building zone 14 of building 10 is shown. Building zone 14 may include a heating, ventilation, and air conditioning (HVAC) vent 22 coupled to ductwork. Supply air flow or ventilation may be provided to zone 14 via vent 22. An environmental control system such as that shown in FIG. 3 may be coupled to vent 22 and may be used to control the amount of warm or cool air allowed into zone 14 via vent 22.

Figure 3:
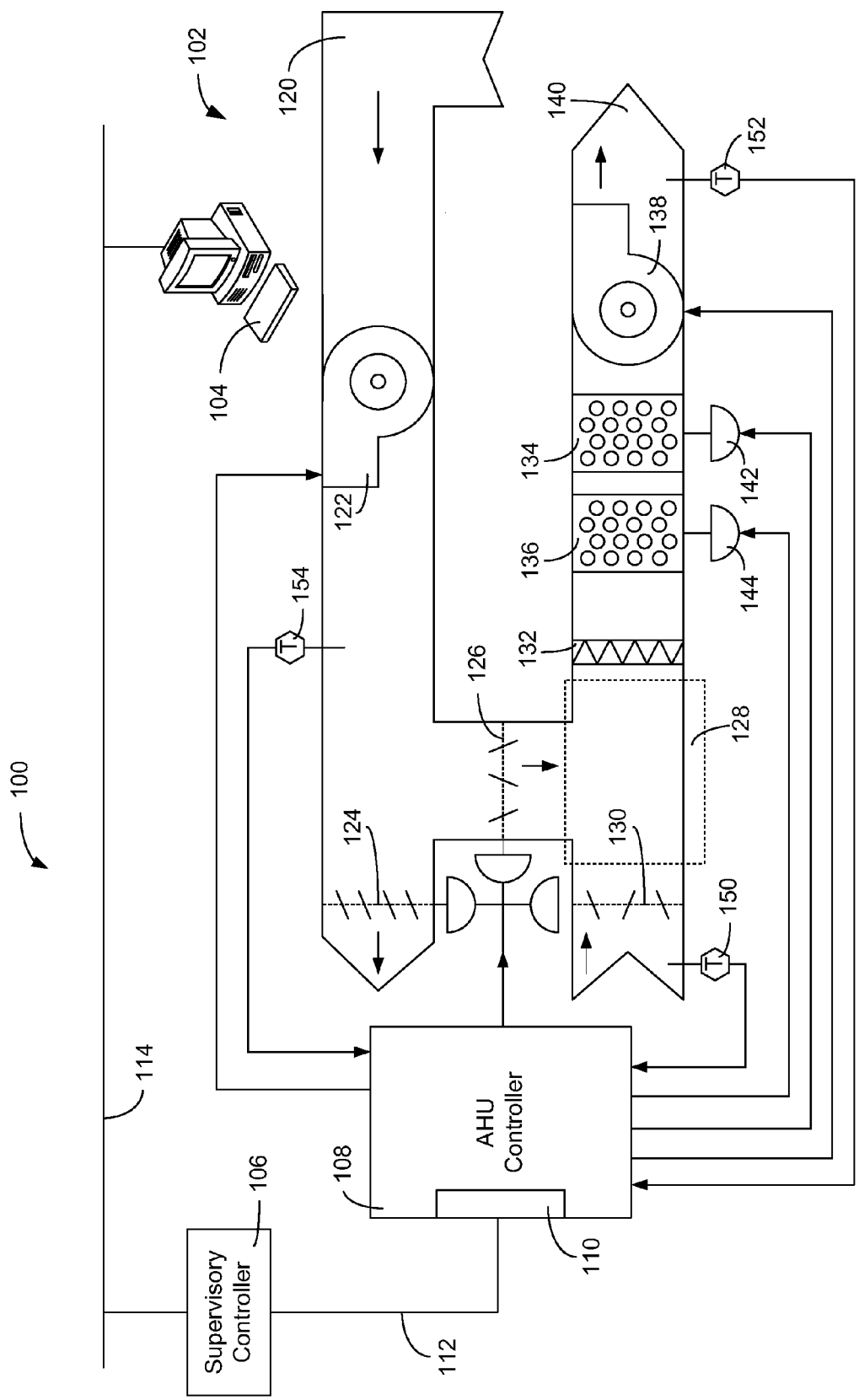
FIG. 3 is a schematic diagram of an environmental control system including an air handling unit that may be used in the building and building zone of FIGS. 1-2, according to an exemplary embodiment.

Sensors 20 may be disposed within and around building zone 14 and may be configured to sense conditions within building zone 14. For example, sensors 20 may be temperature sensors, humidity sensors, air quality sensors, or any other type of sensor configured to sense a building-related condition. Sensors 20 are shown disposed on the walls of building zone 14, but may be located, positioned, or disposed in any manner or location within building zone 14. As illustrated in FIG. 3, the environmental control system configured to affect building zone 14 can make use of the sensor data in its control activities.

Referring to FIG. 3, a schematic diagram of an environmental control system 100 including air handling unit (AHU) 102 is shown, according to an exemplary embodiment. Environmental control system 100 is used to affect a controlled variable of a building zone (e.g., a climate condition of the building zone, a temperature, an oxygen level, an air pollutant level, a humidity level, etc.). In addition to AHU 102, environmental control system 100 includes a workstation 104, a supervisory controller 106 (e.g., a network automation engine (NAE)), and an AHU controller 108. AHU controller 108 is coupled to supervisory controller 106 via communications port 110 of AHU controller 108 and communications link 112 (e.g., a building network, a wireless network, a wired network, the same medium as link 112, etc.). Workstation 104 and supervisory controller 106 are coupled via communications bus 114 (e.g., an in-building network, wireless network, an IP network, etc.). Communications bus 114 may be coupled to additional sections or additional controllers, as well as other components, utilized in environmental control system 100. Environmental control system 100 may be a part of a building automation system (such as a METASYS brand building automation system sold by Johnson Controls, Inc.). According to other exemplary embodiments, environmental control system 100 may be a unitary system having an AHU or another damper system. Supervisory controller 106, a user interface (e.g., at a thermostat) or another device may provide a climate condition setpoint to controller 108. With this setpoint, controller 108 may generally be configured to apply heating or cooling to cause a measurement of the climate condition to be near the setpoint. The circuits and control logic described throughout this application may be implemented within controller 108 or supervisory controller 106. Further, some tasks or calculations may be conducted by one circuit or controller while other tasks or calculations are conducted by another circuit or controller. Accordingly, while many of the embodiments described herein refer to hardware and logic contained within a local AHU controller such as controller 108, the teachings of the present application extend to providing similar hardware and logic in a supervisory controller or another device.

Using AHU 102, air is returned from a building zone through return air duct 120 by being drawn in using return fan 122. Depending on the positions of exhaust damper 124 and recirculation damper 126, the return air may be exhausted outside the building zone or flow from return air duct 120 to mixed air plenum 128, becoming recirculated air. In mixed air plenum 128, fresh outdoor air, drawn through inlet damper 130, is mixed with recirculated air. The mixture passes through a filter 132, a heating coil 136, a cooling coil 134, and a supply fan 138. The temperatures and flow rates of the outdoor and recirculated air streams determine the conditions at the end of mixed air plenum 128. At most only one of the cooling and heating coils 134, 136 should be active at any given time if the control strategy for AHU 102 is implemented properly and there are no faults in AHU 102. After being conditioned by coils 134, 136, the air is distributed to a building zone or zones through supply air duct 140 as supply air.

Cooling coil 134, heating coil 136, and dampers 124, 126, 130 may be operated by AHU controller 108 having control logic which determines the proper combination of system components to activate for maintaining a supply air temperature at a desired value (e.g., a setpoint provided by a user or a supervisory controller). Controller 108 generally implements a control strategy that regulates the mixture of outdoor air with return air and controllably provides mechanical cooling or heating to the mixture of air via coils 134, 136. For example, controller 108 may control cooling coil valve 142 and heating coil valve 144 to change the amount of cooling or heating provided by the supply air output from supply air duct 140.

Controller 108 may receive sensor data from sensors 150, 152, 154 to use in determining the control strategy. An outdoor air temperature sensor 150 may provide controller 108 with a signal from which the temperature of the outdoor air entering AHU 102 can be derived. Supply air temperature sensor 152 provides controller 108 with a signal indicative of the temperature of the air being fed to supply air duct 140 and output for the building zone. Sensor 154 provides controller 108 with a signal indicative of the temperature of the air in return air duct 120 from the building zone.

Figure 4:
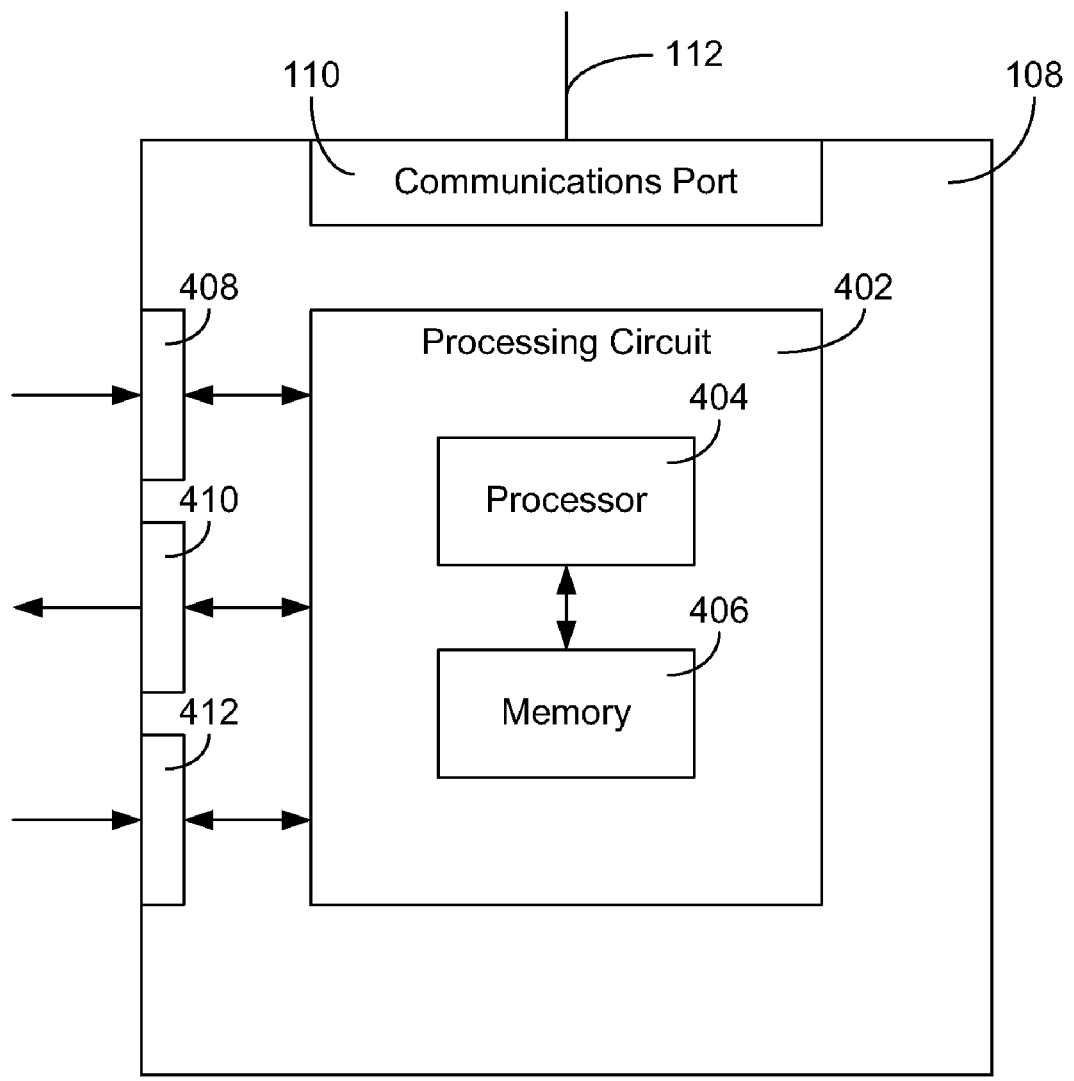
FIG. 4 is a block diagram of the controller of the environmental control system of FIG. 3, according to an exemplary embodiment.

Referring to FIG. 4, a block diagram of controller 108 is shown, according to an exemplary embodiment. Controller 108 includes a processing circuit 402 having a processor 404 and memory 406. Processing circuit 402 is configured to communicate with interfaces 408-412. Processing circuit 402 can be a circuit containing one or more processing components (e.g., processor 404) or a group of distributed processing components. Processor 404 may be a general purpose processor, an application specific processor (ASIC), multiple processors, a field programmable gate array (FPGA), or other processing device. Memory 406 (e.g., memory unit, memory device, storage device, etc.) may be or include one or more devices for storing data or computer code. Computer code stored in memory 406 may configure processing circuit 402 for completing or facilitating the various processes described in the present disclosure. Memory 406 may be or include volatile memory or non-volatile memory. Memory 406 may include database components, object code, scripts, or any other type of information structure for supporting the various activities described in the present disclosure. According to an exemplary embodiment, memory 406 is communicably connected to processor 404 (e.g., via a circuit or other connection) and processor 404 is configured to execute the computer code. Processing circuit 402 may be configured to receive commands or setpoints from a supervisory controller (e.g., supervisory controller 106 of FIG. 3) via a communications interface (e.g., communications port 110) and communications link 112.

Interfaces 408-412 may be configured for input or output activities of controller 108. For example, interface 408 may receive an input relating to the amount of air flow in the AHU. Interface 410 may provide control signal outputs relating to a control strategy for the AHU. For example, referring also to FIG. 3, interface 410 may provide outputs for cooling coil valve 142, heating coil valve 144, supply fan 138, and return fan 122. Interface 412 may receive inputs relating to various temperature (or other sensor) readings. For example, referring also to FIG. 3, interface 412 may receive air temperature data from sensors 150, 152, 154.

Figure 5:
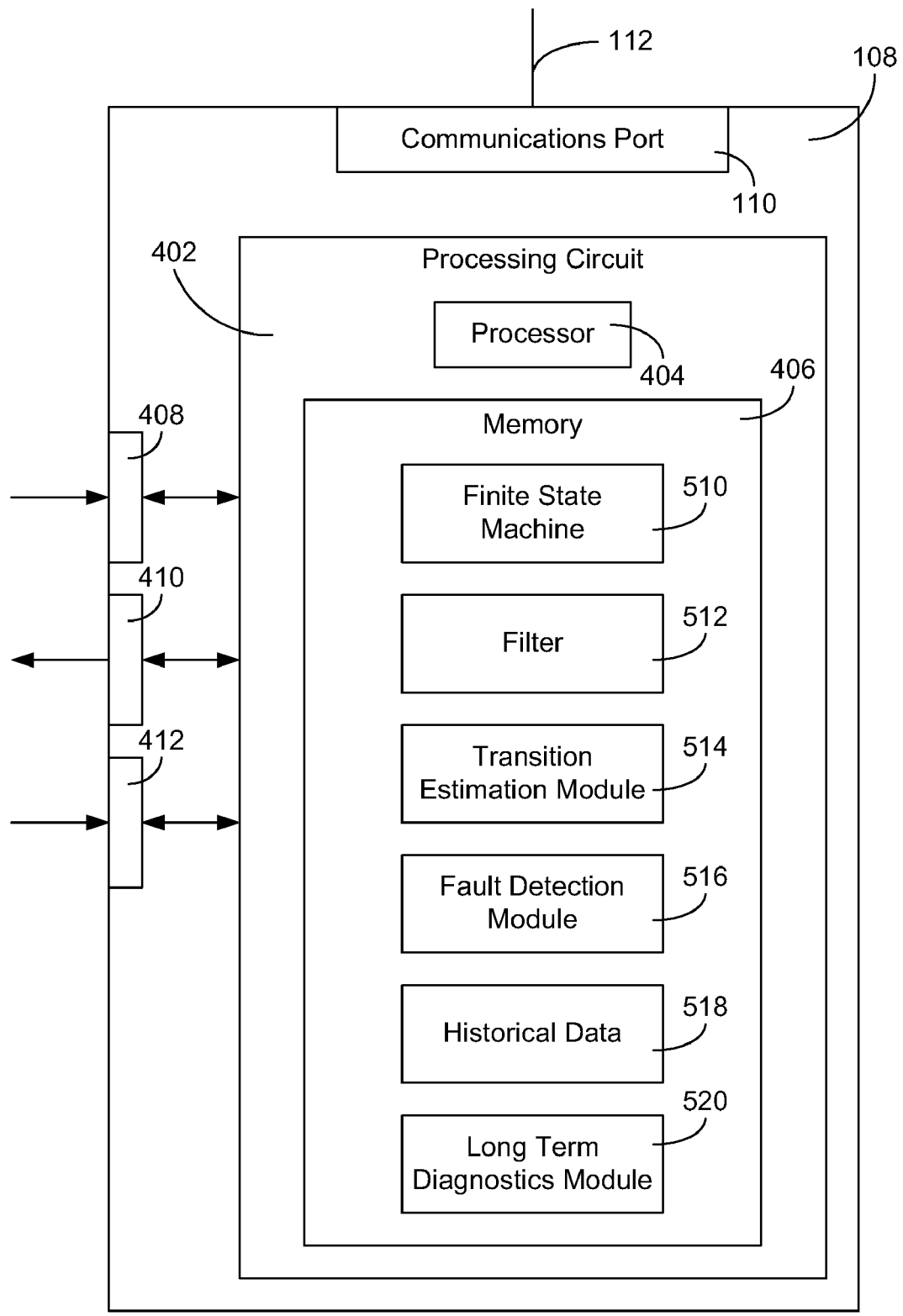
FIG. 5 is a more detailed block diagram of the controller of FIG. 4, according to an exemplary embodiment.

Referring to FIG. 5, a more detailed block diagram of controller 108 is shown, according to an exemplary embodiment. Memory 406 is shown to include finite state machine 510, filter 512, climate condition transition estimation module 514, and fault detection module 516. Finite state machine 510 is configured to determine a state in which the AHU should operate given various system inputs or conditions. Finite state machine 510 includes control logic for transitioning to a new state when system inputs or conditions change. Finite state machine 510 further includes control logic for operating the control system in any of the various possible states. Filter 512 may be generally configured to smooth, filter, or otherwise transform inputs for use by the other modules of memory 406. Referring generally to FIGS. 6-8D, the state transition diagrams of FIGS. 6-7 may be implemented using finite state machine 510.

Transition estimation module 514 is configured to estimate conditions at which finite state machine 510 will change states. Transition estimation module 514 receives inputs from a variety of sources (e.g., sensors, the finite state machine, setpoint data from a supervisory controller, etc.). Transition estimation module 514 may provide other modules (e.g., fault detection module 516) with an estimate of, for example, a temperature at which finite state machine 510 will transition from a heating state to a no heating state. Transition estimation module 514 may be or include computer code for conducting a different estimate depending on the present state of the finite state machine. According to various other embodiments, transition estimation module 514 calculates transition conditions for each possible state of the finite state machine at all times.

Fault detection module 516 is configured to detect a fault of the AHU (e.g., the AHU operating in an incorrect state, the AHU transitioning incorrectly, etc.). Fault detection module 516 may receive estimates of conditions at which finite state machine 510 will change states. According to some embodiments, fault detection module 516 includes the computer code or hardware of transition estimation module 514. Fault detection module 516 may also or alternatively receive data regarding system transitions from historical data 518. Historical data 518 may be a table, relational database, or other information structure configured to store and retain information about historical conditions, state transitions, and the like. Fault detection module 516 may generally be configured to compare inputs to controller 108 or other current system conditions to estimates from module 514 to determine if a fault in the system exists.

Memory 406 is further shown to include long term diagnostics module 520. Long term diagnostics module 520 may be configured to utilize historical data 518 or to receive information about faults as detected by module 516 to further log, process, or annotate data relating to system performance. Long term diagnostics module 520 may further be configured to aggregate historical values of residuals evaluated by the fault detection module and described below. Long term diagnostics module 520 may store these aggregations in memory for later retrieval. Long term diagnostics module 520 may further be configured to provide a report of current or historical residuals or other fault information to another device via communications port 110. For example, long term diagnostics module 520 may be configured to generate and send a text message, data message, or an alarm or alert (e.g., to a supervisory controller, to a user device, etc.) when a fault is detected by the system (e.g., by the fault detection module).

According to an exemplary embodiment, long term diagnostics module 520 (or another module such as fault detection module 516 or filter 512) may be configured to filter residual values (e.g., calculated by fault detection module 516 and representing a comparison of actual performance to modeled performance) to remove noise or outliers prior to reporting any fault or other information. For example, a temperature sensor in the system may provide a spurious value to the controller that temporarily results in the detection of a fault, but, after a short period of time, this may be determined to be mere noise and may be filtered out by the system. Long term diagnostics module 520 may further be configured to calculate and store in memory 406 values such as a trend for a residual over time, a percentage of operating time that a fault is indicated by fault detection module 516, or a "worst" value for a residual or fault over a period of time. When such a worst value is detected, the long term diagnostics module may further be configured to record a plurality of system values to store a "system snapshot." This system snapshot and worst-case fault may subsequently be reported (e.g., via e-mail, printed report, data communications, etc.) to another system for evaluation of what caused the worst-case condition. The long term diagnostics module may further be configured to generate reports or graphs regarding detected faults or residuals.

Figure 6:
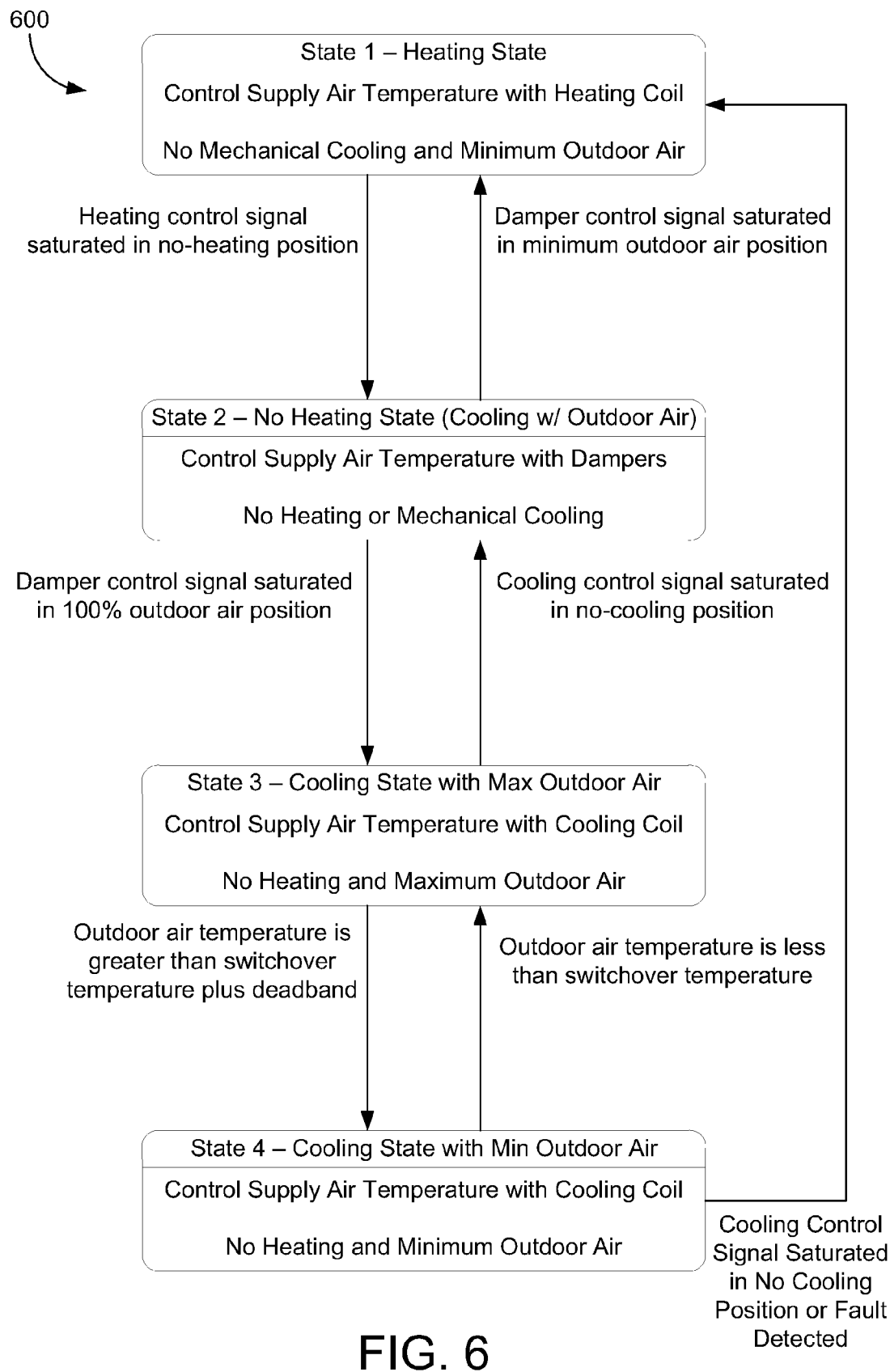
FIG. 6 is a state transition diagram for the operation of the controller of FIG. 4 in an air handling unit, according to an exemplary embodiment.

Referring to FIG. 6, a state transition diagram for finite state machine 510 is shown, according to an exemplary embodiment. The state transition diagram 600 shown in FIG. 6 includes four operational states. State 1 corresponds to a heating state of the AHU. In this state the controller causes a heating coil (e.g., heating coil 136, another mechanical heating element or elements) to add heat to air passing over the coil. The heating state may also include positioning dampers so that the system utilizes a minimum amount of outdoor air and closing the cooling coil valve so that no mechanical cooling is provided to the system (e.g., closing valve 142).

State 2 corresponds to a no heating state (e.g., a mode of cooling with outdoor air only—no mechanical cooling). In State 2 a feedback controller may be used to adjust the damper positioning (e.g., dampers 124, 126, 130) in order to maintain the supply air temperature at a setpoint value without using mechanical cooling. Both the heating and cooling coil valves (e.g., valves 144, 142) may be closed in State 2.

State 3 corresponds to a mechanical cooling mode using 100% outdoor air (e.g., a cooling state with maximum outdoor air) and additional cooling provided by a mechanical cooling element (e.g., cooling coil 134). In State 3, the controller may utilize a feedback loop to adjust the flow of chilled water to a cooling coil. In State 3, an outdoor air damper and exhaust damper (e.g., dampers 130, 124) may be opened and a heating coil valve (e.g. valve 144) and recirculation damper (e.g., damper 126) may be closed.

State 4 corresponds to a mechanical cooling mode using minimum outdoor air (e.g., a cooling state with minimum outdoor air). State 4 is similar to State 3 except the dampers are set in the minimum outdoor air position in an effort to decrease the cooling load on the cooling coil.

Various state transitions may occur between the four states of state transition diagram 600. Some state transitions may occur after a saturation has occurred (e.g., the controller is in a given mode for a predetermined time without being able to adequately control the environment of the building zone). The predetermined time may correspond to a state transition delay (an interval that elapses after a transition into a current state before another transition may occur) for preventing oscillation between states.

According to an exemplary embodiment, a transition from the heating state (State 1) to the no heating state (State 2) occurs after a heating control signal has been saturated in a closed or no-heating position for a period of time equal to a state transition delay (e.g., to indicate heating is not necessary to maintain the supply air temperature at setpoint). A transition from the no heating state to the heating state occurs after a damper control signal has been saturated in the minimum outdoor air position for a period of time equal to a state transition delay (e.g., to indicate heating is necessary to maintain the supply air temperature at setpoint). A transition from the no heating state to the cooling state with maximum outdoor air (State 3) occurs after a damper control signal has been saturated in the maximum outdoor air position for a period of time equal to a state transition delay (e.g., to indicate mechanical cooling is necessary to maintain the supply air temperature at setpoint). A transition from the cooling state with maximum outdoor air to the no heating state occurs after a cooling control signal has been saturated in a closed or no-cooling position for a period of time equal to the state transition delay (e.g., to indicate mechanical cooling is not necessary to maintain the supply air temperature at setpoint).

Figure 7:
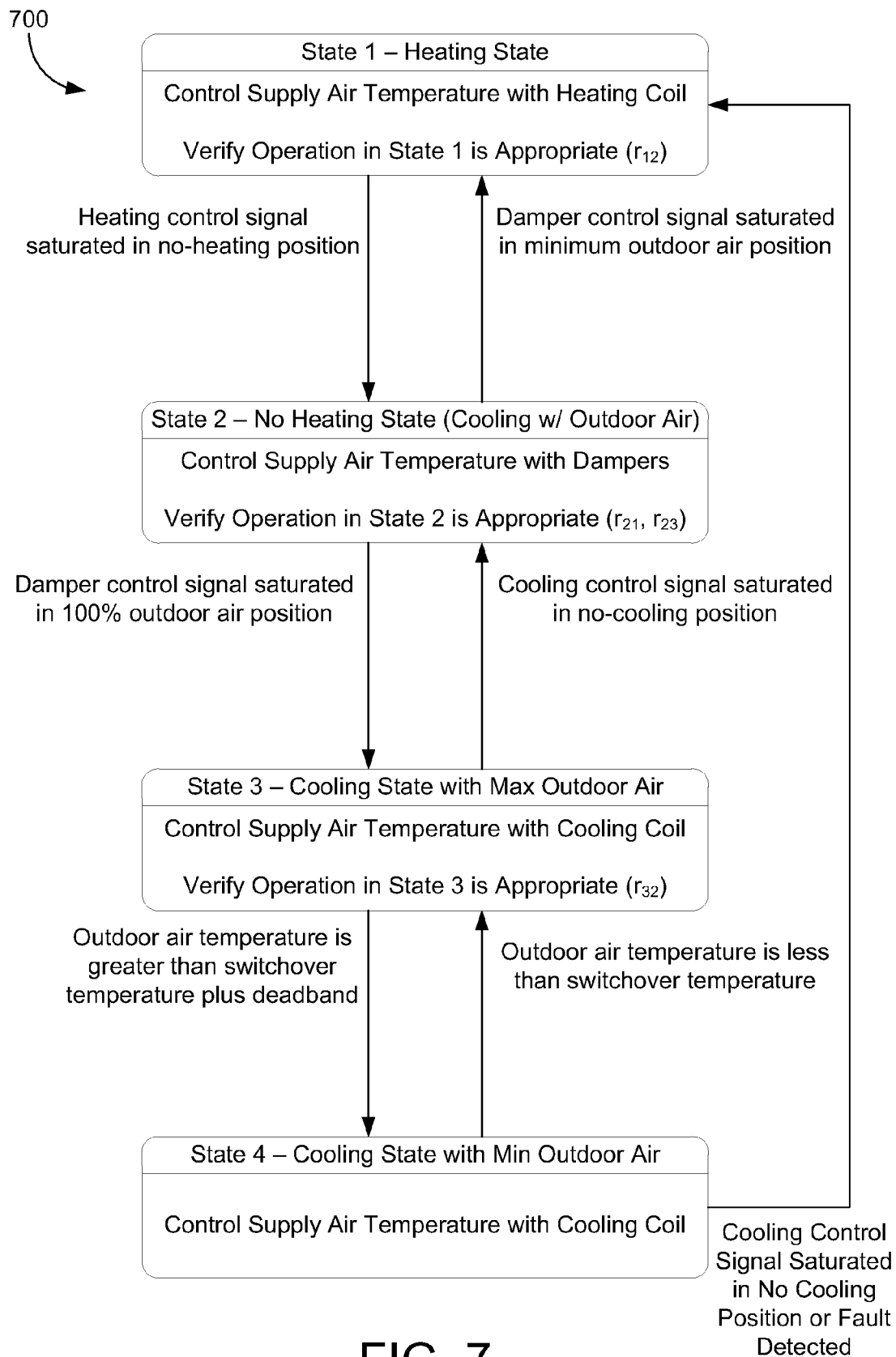
FIG. 7 is a state transition diagram for the operation of the controller of FIG. 4 in an air handling unit, with verification steps shown for detecting faults in the system, according to another exemplary embodiment.

Referring now to FIG. 7, a state transition diagram for finite state machine 510 is shown to include fault detection activities for states 1, 2, and 3. Each state may include a verification step where a residual is calculated to determine if the current state of operation is appropriate. With reference to FIG. 5, fault detection module 516 may be configured to conduct the verification steps while state machine 510 is in the corresponding states (e.g., after state machine 510 has settled in a steady state for a period of time).

In the '544 patent, a system is disclosed for detecting faults by comparing actual system performance to a model of the system, with the comparison producing a residual value indicative of whether the actual performance matches the model. It may be desirable to utilize temperature sensor readings of return air or supply air in residual value calculations rather than utilizing mixed air temperature readings.

The outdoor air fraction at the transition from the heating state to the no heating state can be calculated from the following model:

$$f = \frac{\dot{m}_o}{\dot{m}_s} = \frac{T_s - T_r - \left(\frac{\dot{W}_{fan}}{\dot{m}_s c_p}\right)}{T_o - T_r}$$

where f is the outdoor air fraction at the transition, $\dot{m}_o$ is the mass flow rate of dry outdoor air, $\dot{m}_s$ is the mass flow rate of dry supply air, $\dot{W}_{fan}$ is the power input to the supply fan, $c_p$ is the constant pressure specific heat of moist air, and $T_s$, $T_r$, and $T_o$ are the supply, return, and outdoor air temperatures, respectively. The above equation may be rearranged mathematically to determine $T_o$:

$$T_o = \frac{1}{f}\left[T_s - T_r - \left(\frac{\dot{W}_{fan}}{\dot{m}_s c_p}\right)\right] + T_r.$$

An outdoor air temperature $T_{o,bnd12}$ at which transitions between the heating state and the no heating state are expected to occur may be estimated by replacing the actual supply air temperature with a supply air temperature setpoint $T_{s,set}$ (e.g., supplied by a supervisory controller, set by a user, a supply air temperature sought to be obtained and maintained by the controller) and by replacing the actual outdoor air fraction f with the design minimum outdoor air fraction $f_{design}$ (the outdoor air fraction that should exist or be provided by the system at transitions between the heating state and the no heating state). This substitution provides:

$$T_{o,bnd12} = \frac{1}{f_{design}}\left[T_{s,set} - T_r - \left(\frac{\hat{W}_{fan}}{\hat{m}_s \hat{c}_p}\right)\right] + T_r$$

where the symbol ˆ indicates an estimated value for the given parameter. During normal operation in the heating state, $T_o$ should be lower than $T_{o,bnd12}$. During normal operation in the no heating state, $T_o$ should be greater than $T_{o,bnd12}$. In an exemplary embodiment, the only sensor input utilized by the estimation of $T_{o,bnd12}$ is that of the return air temperature from a temperature sensor. Accordingly, and making use of the outdoor air temperature $T_{o,bnd12}$ at which transitions between the heating state and the no heating state are expected to occur, a new residual $r_{12}$ for evaluation while the system is operating in the heating state may be defined as:

$$r_{12} = \max(0, T_{o,1} - T_{o,bnd12})$$

where $T_{o,1}$ represents the outdoor air temperature in the heating state and $T_{o,bnd12}$ is evaluated using the sensed return air temperature in the heating state. Normal operation of the AHU will result in negative values of the second argument of the equation for $r_{12}$, causing $r_{12}$ to be zero. Positive values of $r_{12}$ indicate that the AHU is operating in the heating state even though the conditions should not require heating to achieve the supply air temperature setpoint. Therefore, $r_{12}$ is nonzero and a fault is indicated (e.g., too much outdoor air is entering the AHU, the cooling coil valve is stuck open or leaking, one or more sensors are faulty, etc.).

Again utilizing the outdoor air temperature $T_{o,bnd12}$ at which transitions between the heating state and the no heating state are expected to occur, a new residual $r_{21}$ for evaluation while the system is operating in the no heating state may be defined as:

$$r_{21} = \min(0, T_{o,2} - T_{o,bnd12})$$

where $T_{o,2}$ represents the outdoor air temperature in the no heating state and $T_{o,bnd12}$ is evaluated using the return air temperature in the no heating state. As above, in an exemplary embodiment, the only sensor input utilized by the estimation of $T_{o,bnd12}$ is that of the return air temperature from a temperature sensor. While in the no heating state, normal operation of the AHU will result in positive values of the second argument of the equation for $r_{21}$, causing $r_{21}$ to be zero. Negative values of $r_{21}$ indicate that the AHU is operating in the no heating state even though the conditions should require heating to achieve the supply air temperature setpoint. A fault can therefore be indicated (e.g., too little outdoor air is entering the AHU, the heating coil valve is stuck open or leaking, one or more sensors are faulty, etc.) when $r_{21}$ is not zero.

At transitions between the no heating state and the cooling state with maximum outdoor air (State 2 and State 3), the heating coil and cooling coil valves are closed and the mixing box dampers are positioned for 100% outdoor air. Accordingly, the difference between the supply air temperature and outdoor air temperature may be defined as:

$$T_s - T_o = \frac{\dot{W}_{fan}}{\dot{m}_s c_p}.$$

Substituting a supply air temperature setpoint $T_{s,set}$ for $T_s$ and solving for outdoor air temperature provides the outdoor air temperature estimate $T_{o,bnd23}$ at which transitions between the no heating state (State 2) and the cooling state with maximum outdoor air (State 3) should occur:

$$T_{o,bnd23} = T_{s,set} - \frac{\dot{W}_{fan}}{\dot{m}_s c_p}.$$

During normal operation in the no heating state, $T_o$ should be lower than $T_{o,bnd23}$. During normal operation in the cooling state with maximum outdoor air, $T_o$ should be greater than $T_{o,bnd23}$. A residual $r_{23}$ that may be evaluated while in the no heating state may be defined as:

$$r_{23} = \max(0, T_{o,2} - T_{o,bnd23}).$$

Accordingly, during normal operation of the AHU in the no heating state, the second argument in the equation for $r_{23}$ will be negative, causing $r_{23}$ to be zero. Positive values of $r_{23}$ indicate that the AHU is operating in the no heating state even though the conditions should require mechanical cooling to achieve the supply air temperature setpoint (e.g., the cooling coil valve is stuck open or leaking, one or more sensors are faulty, etc.). When $r_{23}$ is nonzero a fault can be indicated.

A residual $r_{32}$ that may be evaluated during operation in the cooling state with maximum outdoor air may be defined as:

$$r_{32} = \min(0, T_{o,3} - T_{o,bnd23}).$$

Normal operation of the AHU will result in positive values of the second argument of the equation for $r_{32}$, causing $r_{32}$ to be zero. Negative values of $r_{32}$ indicate that the AHU is operating in the cooling state with maximum outdoor air even though the conditions should not require mechanical cooling to achieve the supply air temperature setpoint. Therefore, $r_{32}$ is nonzero and a fault is indicated (e.g., too little outdoor air is entering the AHU, the heating coil valve is stuck open or leaking, one or more sensors are faulty, etc.). $r_{23}$ and $r_{32}$ advantageously only require a temperature sensor input from the outdoor air sensor (i.e., $T_{o,2}$ or $T_{o,3}$) for evaluation.

According to various embodiments, the calculation of residuals or comparisons between values may be completed by methods other than subtracting values. For example, in some embodiments normal operation versus faulty operation may be evaluated by comparing a fraction or ratio of transition temperature estimates relative to current outdoor air temperature sensor readings or the like.

Figure 8A:
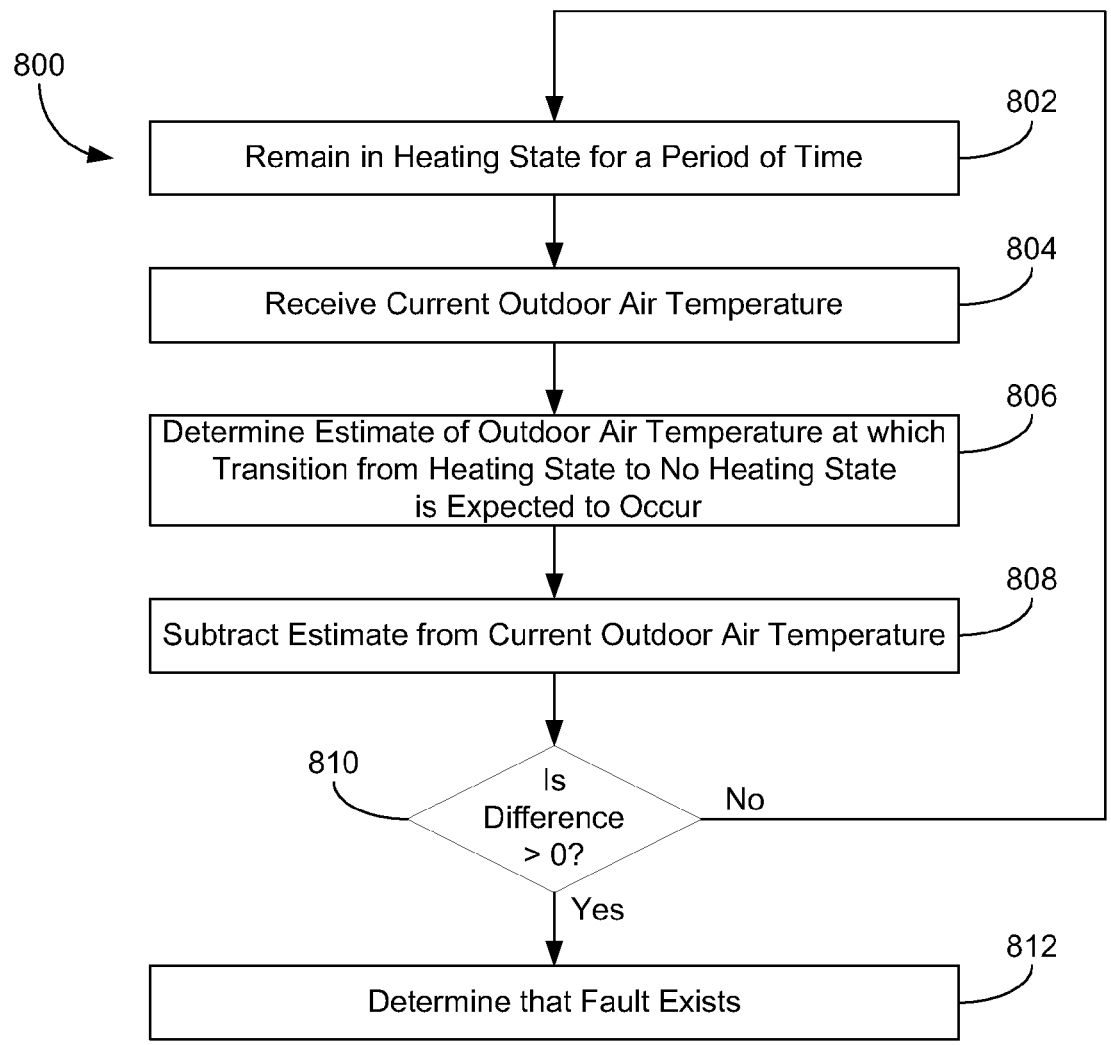
FIGS. 8A-D are flow charts of processes for fault detection in various states of operation of an air handling unit, according to exemplary embodiments.

Referring now to FIGS. 8A-D, processes 800-860 may be executed by a fault detection module (e.g., fault detection module 516 of FIG. 5) to check for faults in an environmental control system. Referring to FIG. 8A, a flow chart of a process 800 for detecting faults in a heating state (State 1 of FIGS. 6 and 7) of operation is shown, according to an exemplary embodiment. Process 800 may initiate or be conducted when the system remains in the heating state for a period of time (step 802). A current outdoor air temperature measurement may be received (step 804) from a sensor and an estimate of an outdoor air temperature at which a transition from the heating state to the no heating state is expected to occur may be determined (step 806). The estimate of step 806 may be subtracted from the current temperature received in step 804 to determine a difference (step 808). If the difference is greater than zero (step 810), a determination may be made that a fault exists (step 812) as the difference indicates the AHU should be operating in the no heating state instead of the heating state. Process 800 may correspond with the evaluation of residual $r_{12}$ described above.

Figure 8B:
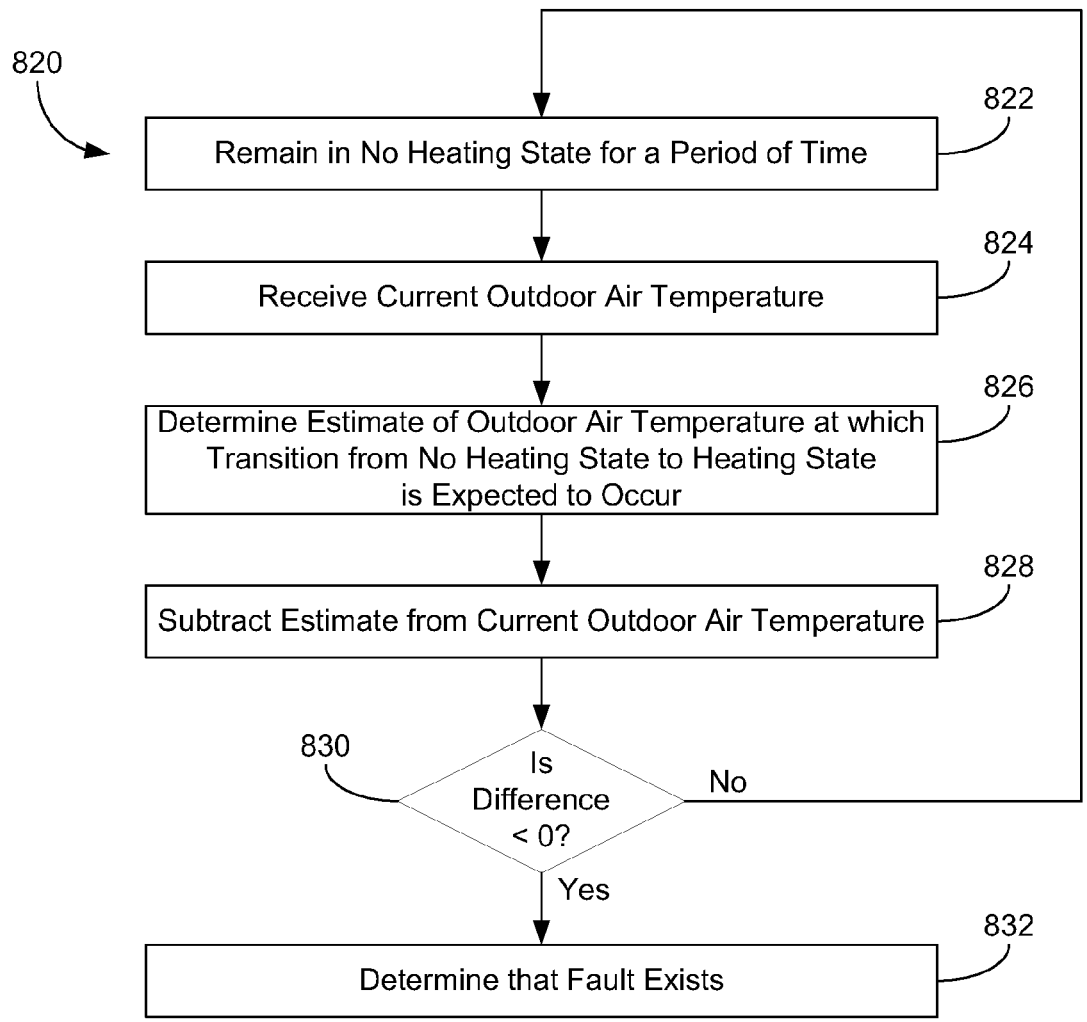

Referring to FIG. 8B, a flow chart of a process 820 for fault detection in a no heating state (State 2 of FIGS. 6 and 7) of operation of an AHU is shown, according to an exemplary embodiment. Process 820 may initiate or be conducted when the system remains in the no heating state for a period of time (step 822). A current outdoor air temperature measurement may be received (step 824) from a sensor and an estimate of an outdoor air temperature at which a transition from the no heating state to the heating state is expected to occur may be determined (step 826). The estimate of step 826 may be subtracted from the current temperature received in step 824 to determine a difference (step 828). If the difference is less than zero (step 830), a determination may be made that a fault exists (step 832) as the difference indicates the AHU should be operating in the heating state instead of the no heating state. Process 820 may correspond with the evaluation of residual $r_{21}$ described above.

Figure 8C:
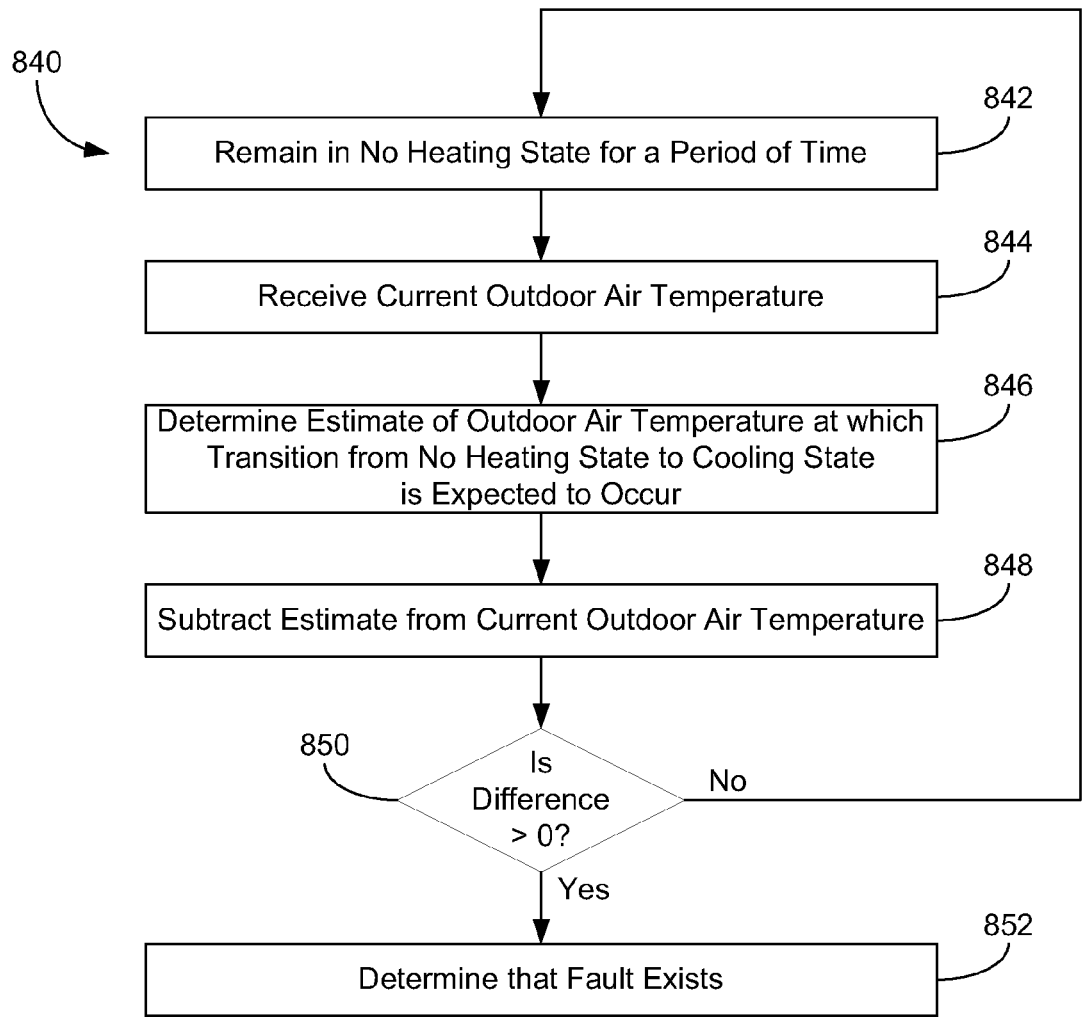

Referring to FIG. 8C, a flow chart of another process 840 for fault detection in a no heating state (State 2 of FIGS. 6 and 7) of operation of an AHU is shown, according to an exemplary embodiment. Process 840 may initiate or be conducted when the system remains in the no heating state for a period of time (step 842). A current outdoor air temperature measurement may be received (step 844) from a sensor and an estimate of an outdoor air temperature at which a transition from the no heating state to the cooling state with maximum outdoor air is expected to occur may be determined (step 846). The estimate of step 846 may be subtracted from the current temperature received in step 844 to determine a difference (step 848). If the difference is greater than zero (step 850), a determination may be made that a fault exists (step 852) as the difference indicates the AHU should be operating in the cooling state with maximum outdoor air instead of the no heating state. Process 840 may correspond with the evaluation of residual $r_{23}$ described above.

Figure 8D:
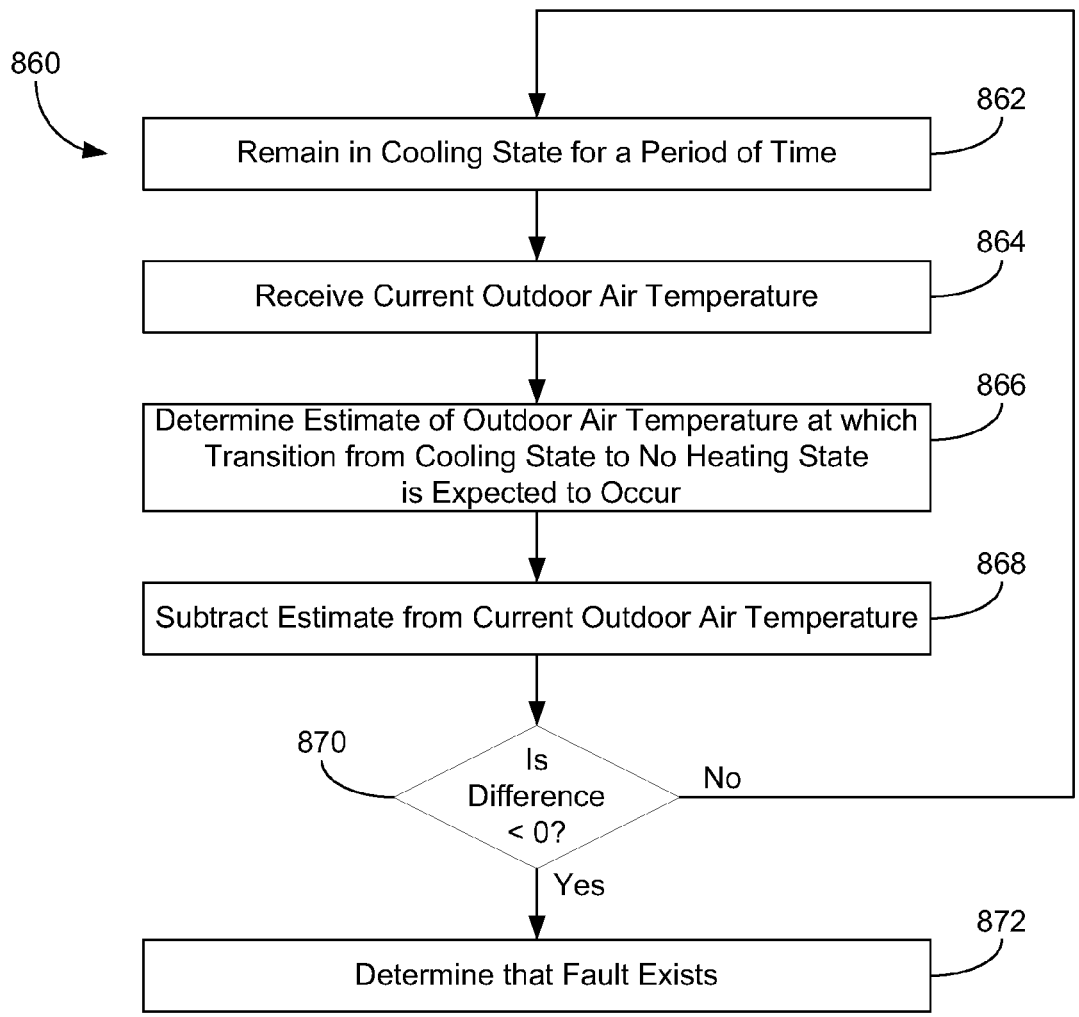

Referring to FIG. 8D, a flow chart of a process 860 for fault detection in a cooling state with maximum outdoor air (State 3 of FIGS. 6 and 7) of operation of an AHU is shown, according to an exemplary embodiment. Process 860 may initiate or be conducted when the system remains in the cooling state for a period of time (step 862). A current outdoor air temperature measurement may be received (step 864) from a sensor and an estimate of an outdoor air temperature at which a transition from the cooling state with maximum outdoor air to the no heating state is expected to occur may be determined (step 866). The estimate of step 866 may be subtracted from the current temperature received in step 864 to determine a difference (step 868). If the difference is less than zero (step 870), a determination may be made that a fault exists (step 872) as the difference indicates the AHU should be operating in the no heating state instead of the cooling state. Process 860 may correspond with the evaluation of residual $r_{32}$ described above.

While the exemplary embodiments illustrated in the figures and described herein are presently preferred, it should be understood that the embodiments are offered by way of example only. The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, orientations, system layouts, particular equations, control strategies, number of states, consolidation or distribution of processing components, number of inputs, aggregation of inputs, use for the outputs, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for detecting faults in an environmental control system for a building zone, the environmental control system controlled by a finite state machine that causes states of the environmental control system to change based on a varying climate condition, the system comprising:
   a circuit configured to receive a current value for the climate condition when the environmental control system is in a heating state and, during the heating state, to calculate an estimate of the climate condition at which a transition from the heating state to a state of no heating by the environmental control system is expected to be caused by the finite state machine;
   wherein the circuit is configured to determine, prior to beginning the transition from the heating state to the state of no heating, that a fault exists based on a comparison of:
   (a) the current value for the climate condition in the heating state, and
   (b) the estimate of the climate condition at which a transition from the heating state to the no heating state is expected to be caused by the finite state machine.

2. The system of claim 1, wherein the comparison of (a) and (b) comprises subtracting (b) from (a).

3. The system of claim 2, wherein the circuit is configured to determine that the fault exists when the result of the subtraction is positive.

4. The system of claim 2, wherein the comparison comprises calculating a residual r using the equation r=max(0, $T_{o,1}-T_{o,bnd12}$), where $T_{o,1}$ represents the outdoor air temperature in the heating state and $T_{o,bnd12}$ is the estimate of the outdoor air temperature at which the transition from the heating state to the no heating state is expected to be caused by the finite state machine.

5. The system of claim 4, wherein $T_{o,bnd12}$ is estimated using the return air temperature in the heating state.

6. The system of claim 5, wherein the environmental control system is an air handling unit (AHU), and wherein normal operation of the AHU in the heating state will result in negative values of $T_{o,1}-T_{o,bnd12}$, causing r to be zero, and wherein positive values of r indicate that the AHU is operating in the heating state even though the system and environmental conditions should not require heating to achieve a target supply air temperature setpoint.

7. The system of claim 1, wherein the environmental control system is an air handling unit (AHU), and wherein the circuit is configured to receive an outdoor air temperature provided by a sensor and to use the outdoor air temperature as the current value for the climate condition.

8. The system of claim 7, wherein the circuit is configured to estimate the climate condition at which the transition will occur while in the heating state.

9. The system of claim 8, wherein the circuit is configured to estimate the climate condition at which the transition from the heating state to the no heating state is expected based on a design minimum fraction of the mass flow rate of outdoor air in the AHU over the mass flow rate of the supply air in the AHU at the transition from the heating state to the no heating state; and wherein the estimate is also based on a supply air temperature setpoint.

10. The system of claim 9, wherein the circuit is configured to estimate the climate condition at which the transition from the heating state to the no heating state is expected to occur by calculating $$T_{o,bnd12} = \frac{1}{f_{design}}\left[T_{s,set} - T_r - \left(\frac{\hat{W}_{fan}}{\hat{m}_s \hat{c}_p}\right)\right] + T_r,$$

where $f_{design}$ is the design minimum outdoor air fraction, $\hat{m}_s$ is the estimated mass flow rate of dry supply air, $\hat{W}_{fan}$ is the estimated power input to the supply fan, $\hat{c}_p$ is the estimated constant pressure specific heat of moist air, $T_{s,set}$ is the supply air temperature setpoint, and $T_r$ is the return air temperature.

11. A system for detecting faults in an environmental control system for a building zone, the environmental control system controlled by a finite state machine that causes states of the environmental control system to change based on a varying climate condition, the system comprising:
 a circuit configured to receive a current value for the climate condition when the environmental control system is in a no heating state and, when in the no heating state, to calculate an estimate of the climate condition at which a transition from the no heating state to a heating state is expected to be caused by the finite state machine;
 wherein the circuit is configured to determine, prior to beginning the transition from the no heating state to the heating state, that a fault exists based on a comparison of:
 (a) the current value for the climate condition in the no heating state, and
 (b) the estimate of the climate condition at which a transition from the no heating state to the heating state is expected to be caused by the finite state machine.

12. The system of claim 11, wherein the comparison of (a) and (b) comprises subtracting (b) from (a).

13. The system of claim 12, wherein the circuit is configured to determine that the fault exists when the result of the subtraction is negative.

14. The system of claim 13, wherein the comparison comprises calculating a residual r using the equation r=min(0, $T_{o,2}-T_{o,bnd12}$), where $T_{o,2}$ represents the outdoor air temperature in the no heating state and $T_{o,bnd12}$ is the estimate of the climate condition at which the transition from the no heating state to the heating state is expected to be caused by the finite state machine.

15. The system of claim 11, wherein the environmental control system is an air handling unit (AHU), and wherein normal operation of the AHU in the no heating state will result in positive values of $T_{o,2}-T_{o,bnd12}$, causing r to be zero, and wherein negative values of r indicate that the AHU is operating in the no heating state even though the system and environmental conditions should require heating to achieve the supply air temperature setpoint.

16. The system of claim 15, wherein the processing circuit further includes a diagnostics module configured to aggregate historical values of r in memory.

17. The system of claim 16, wherein the diagnostics module is further configured to calculate and store in memory at least one of:
 (a) a trend for r over time,
 (b) a percentage of operating time that r indicates a fault, and
 (c) a highest value for r over a period of time.

18. The system of claim 17, wherein the long term diagnostics module is further configured to record a plurality of system values when a new highest value for r is detected.

19. A method for detecting faults in an environmental control system affecting a building zone, the method comprising:
 controlling the environmental control system using a controller implementing the control via finite state machine logic, the controller causing the environmental control system to change states based on a varying climate condition;
 receiving, at a circuit, a current value for the climate condition when the environmental control system is in a no heating state;
 calculating, using the circuit and during the no heating state, an estimate of the climate condition at which a transition from the no heating state to a heating state is expected to be caused by the controller's finite state machine logic;
 prior to beginning a transition from the no heating state to the heating state, comparing the current value for the climate condition when the environmental control system is in a no heating state to the estimate of the climate condition at which the transition from the no heating state to the heating state is expected to be caused; and
 determining that a fault exists based on the comparison.

20. A method for detecting faults in an environmental control system affecting a building zone, the method comprising:

controlling the environmental control system using a controller implementing the control via finite state machine logic, the controller causing the environmental control system to change states based on a varying climate condition;

receiving, at a circuit, a current value for the climate condition when the environmental control system is in a heating state;

calculating, using the circuit and during the heating state, an estimate of the climate condition at which a transition from the heating state to a no heating state is expected to be caused by the controller's finite state machine logic;

prior to beginning a transition from the heating state to the no heating state, comparing the current value for the climate condition when the environmental control system is in a heating state to the estimate of the climate condition at which the transition from the heating state to the no heating state is expected to be caused; and determining that a fault exists based on the comparison.

* * * * *